(12) United States Patent
Ii

(10) Patent No.: US 11,616,405 B2
(45) Date of Patent: Mar. 28, 2023

(54) OBJECT DETECTION APPARATUS, POWER TRANSMISSION APPARATUS, AND POWER TRANSMISSION SYSTEM

(71) Applicant: TDK CORPORATION, Tokyo (JP)

(72) Inventor: Akihiro Ii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/540,871

(22) Filed: Dec. 2, 2021

(65) Prior Publication Data

US 2022/0239159 A1    Jul. 28, 2022

(30) Foreign Application Priority Data

Jan. 26, 2021   (JP) .............................. JP2021-010708

(51) Int. Cl.
*H02J 50/60*   (2016.01)
*B60L 53/124*  (2019.01)
*H01F 38/14*   (2006.01)
*H02J 50/12*   (2016.01)

(52) U.S. Cl.
CPC ............ *H02J 50/60* (2016.02); *B60L 53/124* (2019.02); *H01F 38/14* (2013.01); *H02J 50/12* (2016.02)

(58) Field of Classification Search
CPC .. H02J 50/80; H02J 50/10; H02J 50/60; H02J 50/90
See application file for complete search history.

(56) References Cited

U.S. PATENT DOCUMENTS

| 10,323,938 B2* | 6/2019 | Baer ..................... G01B 21/042 |
| 2004/0189514 A1* | 9/2004 | Schlick ................. G01S 7/4004 |
| | | 342/165 |
| 2012/0235506 A1* | 9/2012 | Kallal .................... H02J 50/80 |
| | | 307/104 |

(Continued)

FOREIGN PATENT DOCUMENTS

| JP | 4097483 B2 * | 6/2008 |
| JP | 2018-502538 A | 1/2018 |

(Continued)

OTHER PUBLICATIONS

Jung "Object Detection and Tracking-Based Camera Calibration for Normalized Human Height Estimation," Journal of Sensors vol. 2016, Article ID 8347841,9 pages (Year: 2016).*

*Primary Examiner* — Pinping Sun
(74) *Attorney, Agent, or Firm* — Oliff PLC

(57) ABSTRACT

An object detection apparatus includes a sensor module including a sensor, and a controller that controls the sensor and generates output information, based on a signal that the sensor outputs; and a detector that determines presence or absence of the object, based on the output information. The detector executes a reference object detection process of detecting a reference object existing at a predetermined position within the detection range, by comparing the output information and predetermined reference information, and, when the reference object is detected, executes a correction process of correcting at least one of the output information or a parameter for the sensor, based on the reference information and reference object information that is information indicative of the reference object in the output information.

12 Claims, 14 Drawing Sheets

(56) References Cited

U.S. PATENT DOCUMENTS

| | | | | |
|---|---|---|---|---|
| 2015/0301159 A1* | 10/2015 | Scheschko | ............ | G01S 7/4026 |
| | | | | 342/174 |
| 2016/0033280 A1* | 2/2016 | Moore | ................. | G01C 21/206 |
| | | | | 701/472 |
| 2016/0109564 A1* | 4/2016 | Sieber | .................... | B60L 53/36 |
| | | | | 342/27 |
| 2016/0336760 A1* | 11/2016 | Yamamoto | .............. | H02J 50/12 |
| 2019/0357857 A1* | 11/2019 | Tanaka | ................. | A61B 5/7275 |
| 2019/0363588 A1* | 11/2019 | Daetwyler | ............. | H02J 50/60 |
| 2020/0328625 A1* | 10/2020 | Mills | ................... | H04B 5/0037 |

FOREIGN PATENT DOCUMENTS

| | | | | |
|---|---|---|---|---|
| WO | 2016/060748 A1 | 4/2016 | | |
| WO | WO-2019182499 A1 * | 9/2019 | ............ | G01S 1/026 |
| WO | WO-2021160444 A1 * | 8/2021 | | |

* cited by examiner

FIG. 8

REFERENCE INFORMATION

| DETECTION DISTANCE (mm) | DETECTION AMPLITUDE (mV) |
|---|---|
| 100 | 1000 |

FIG. 9

OUTPUT INFORMATION

| RECORD NO. | DETECTION DISTANCE (mm) | DETECTION AMPLITUDE (mV) |
|---|---|---|
| 1 | 95 | 900 |
| 2 | 495 | 1800 |
| 3 | 995 | 90 |

OBJECT DETECTION APPARATUS, POWER TRANSMISSION APPARATUS, AND POWER TRANSMISSION SYSTEM

CROSS-REFERENCE TO RELATED APPLICATION

This application claims the benefit of Japanese Patent Application No. 2021-10708, filed on Jan. 26, 2021, the entire disclosure of which is incorporated by reference herein.

FIELD

This application relates generally to an object detection apparatus, a power transmission apparatus, and a power transmission system.

BACKGROUND

Attention has been paid to wireless power transmission technology that wirelessly transmits electric power. Since the wireless power transmission technology enables wireless transmission of electric power from a power transmission apparatus to a power receiving apparatus, it is expected that the wireless power transmission technology is applied to various products, for example, transport equipment such as an electric train or an electric vehicle, household equipment, wireless communication equipment, and toys. In the wireless power transmission technology, a power transmission coil and a power receiving coil are coupled by magnetic flux in order to transmit electric power.

In the meantime, if an object such as a living body or a metal piece is present near the power transmission coil, there is a possibility that various problems will arise. For example, when a living body is present near the power transmission coil, there is a possibility that the living body is exposed to an electromagnetic field occurring at the time of power transmission, and a health problem arises in the living body. Accordingly, there is a demand for an object detection apparatus that properly detects an object existing near the power transmission coil.

Japanese Patent No. 6636510 discloses an apparatus that detects an object in a detection area near a wireless power transmission system for charging an electric vehicle. The apparatus disclosed in Japanese Patent No. 6636510 determines at least one of a distance to an object, a velocity of the object, a position of the object, a direction of the object, or a size of the object, based on radar data received from a radar transceiver.

SUMMARY

However, in the apparatus disclosed in Japanese Patent No. 6636510, no consideration is given to variations in an environment, such as a temperature, a humidity, a light quantity or a wind velocity, a degradation with time of the apparatus, and the like. Thus, in the apparatus disclosed in Japanese Patent No. 6636510, even if the condition of presence of the object is the same, if the environment, the age of service of the apparatus, and the like are different, there is a possibility that a difference occurs in the determination result. In short, in the apparatus disclosed in Japanese Patent No. 6636510, it is considered that the detection of the object with high precision is difficult. Thus, there is a demand for technology for detecting an object with high precision at a time of wireless power transmission.

The present disclosure has been made in consideration of the above problem, and the objective of the disclosure is to detect an object with high precision at a time of wireless power transmission.

In order to solve the above problem, an object detection apparatus according to an embodiment of the present disclosure, which is an object detection apparatus that detects an object existing within a detection range, includes:

a sensor module including a sensor, and a controller that controls the sensor and generates output information, based on a signal that the sensor outputs; and a detector that determines presence or absence of the object, based on the output information, wherein the detector executes a reference object detection process of detecting a reference object existing at a predetermined position within the detection range, by comparing the output information and predetermined reference information, and, when the reference object is detected, executes a correction process of correcting at least one of the output information or a parameter for the sensor, based on the reference information and reference object information that is information indicative of the reference object in the output information.

According to the above configuration, an object can be detected with high precision at a time of wireless power transmission.

BRIEF DESCRIPTION OF THE DRAWINGS

A more complete understanding of this application can be obtained when the following detailed description is considered in conjunction with the following drawings, in which:

FIG. 8 is a diagram illustrating reference information;

FIG. 9 is a diagram illustrating output information;

DETAILED DESCRIPTION

Figure 1:
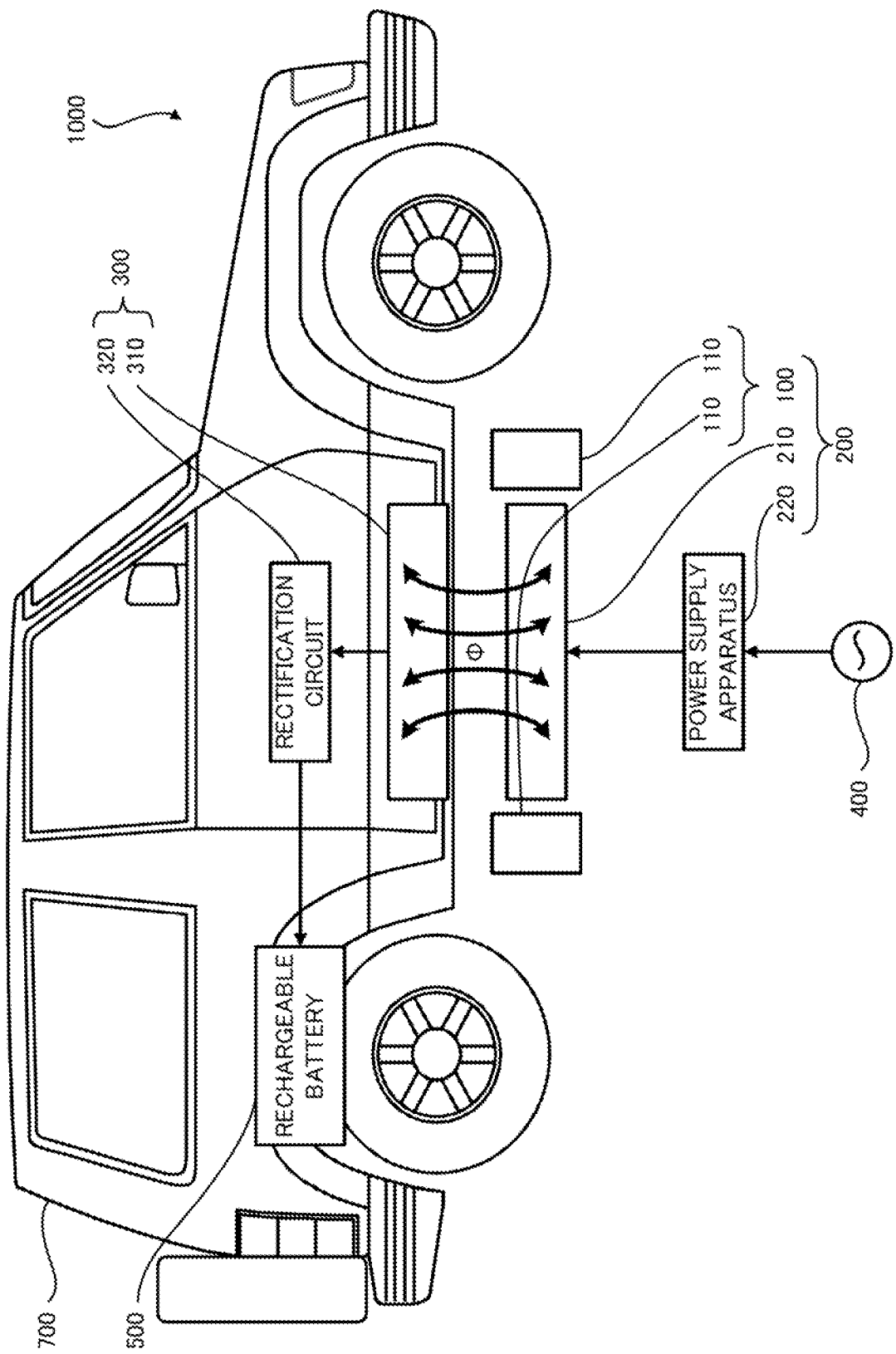
FIG. 1 is a schematic configuration diagram of a power transmission system according to Embodiment 1.

Hereinafter, a power transmission system according to an embodiment of a technology relating to the present disclosure will be described with reference to the accompanying drawings. Note that in the embodiment to be described below, the same structural parts are denoted by the same reference signs. In addition, the ratios in magnitude and the shapes of the structural elements illustrated in the drawings are not necessarily the same as the actual ones.

Embodiment 1

A power transmission system according the present embodiment is usable for charging secondary batteries of various apparatuses, for instance, an electric vehicle (EV), mobile equipment such as a smartphone, and industrial equipment. Hereinafter, a description will be given of, by way of example, a case of charging a rechargeable battery of an EV.

FIG. 1 is a schematic configuration diagram of a power transmission system 1000 that is used for charging a rechargeable battery 500 included in an electric vehicle 700. The electric vehicle 700 runs by using, as a driving source, a motor that is driven by electric power that is charged in the rechargeable battery 500 such as a lithium ion battery or a lead storage battery. The electric vehicle 700 is an example of a movable body.

As illustrated in FIG. 1, the power transmission system 1000 is a system that wirelessly transmits electric power from a power transmission apparatus 200 to a power receiving apparatus 300 by magnetic coupling. The power transmission system 1000 includes a power transmission apparatus 200 that wirelessly transmits electric power of an alternating-current (AC) or direct-current (DC) commercial power source 400 to the electric vehicle 700; and a power receiving apparatus 300 that receives the electric power transmitted by the power transmission apparatus 200 and charges the rechargeable battery 500. Note that in the description below, the commercial power source 400 is an AC power source.

The power transmission apparatus 200 is an apparatus that wirelessly transmits electric power to the power receiving apparatus 300 by magnetic coupling. The power transmission apparatus 200 includes an object detection apparatus 100 that detects an object; a power transmission coil unit 210 that transmits AC power to the electric vehicle 700; and a power supply apparatus 220 that supplies AC power to the power transmission coil unit 210. A detailed description of the object detection apparatus 100 will be given later.

Figure 2:
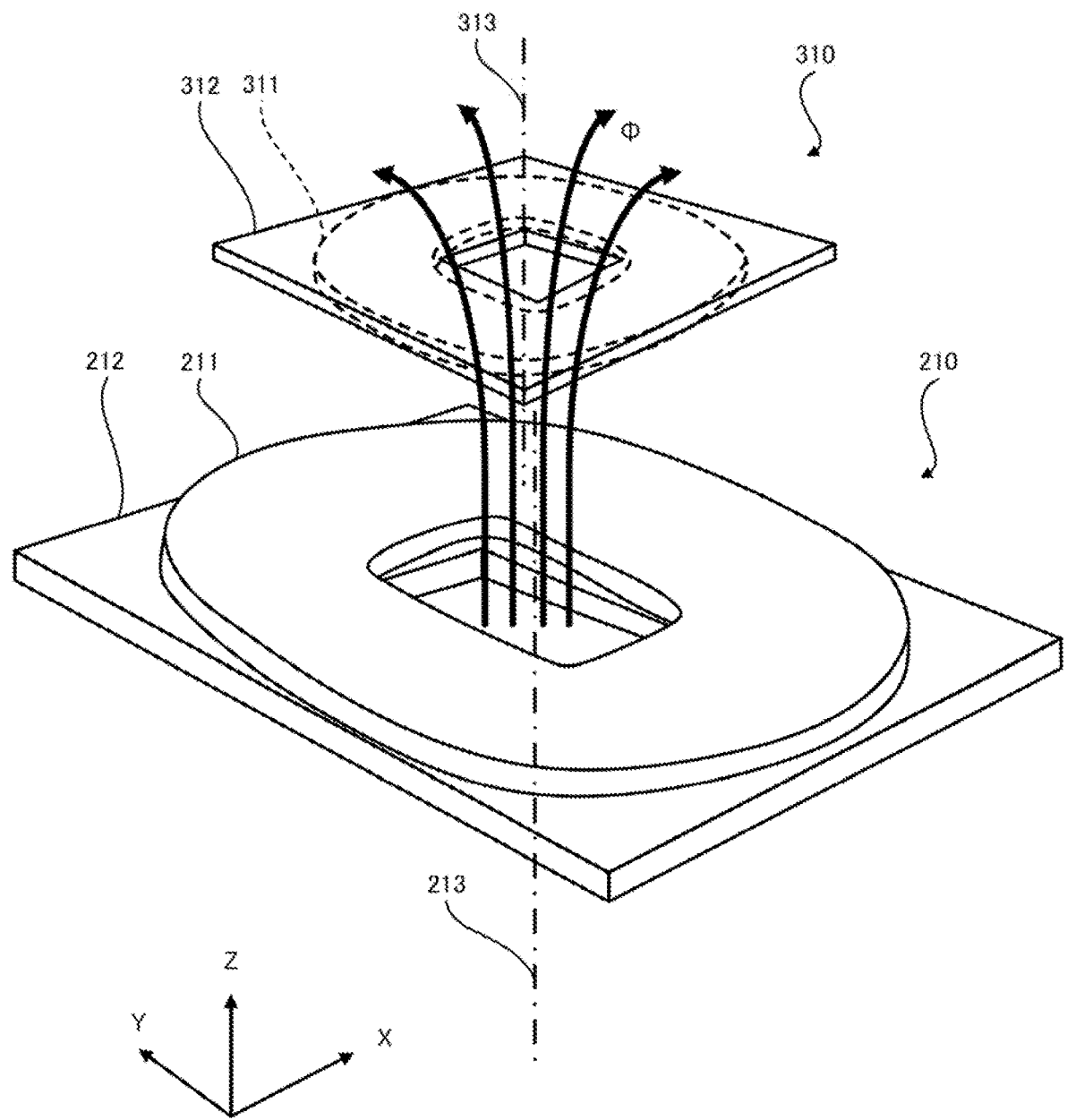
FIG. 2 is a perspective view of a power transmission coil unit and a power receiving coil unit according to Embodiment 1.

FIG. 2 illustrates a main part of the power transmission coil unit 210, and a main part of the power receiving coil unit 310. As illustrated in FIG. 2, the power transmission coil unit 210 includes a power transmission coil 211 that is supplied with AC power from the power supply apparatus 220 and induces an alternating magnetic flux Φ; and a magnetic material plate 212 that passes magnetic force generated by the power transmission coil 211 and suppresses a loss of the magnetic force. The power transmission coil 211 is composed such that a lead wire is spirally wound around a coil axis 213 on the magnetic material plate 212. The power transmission coil 211 and capacitors provided at both ends of the power transmission coil 211 constitute a resonance circuit, and an alternating magnetic flux Φ is induced by the flow of an AC current due to the application of an AC voltage. In FIG. 2, an axis in a vertically upward direction is a Z-axis, an axis orthogonal to the Z-axis is an X-axis, and an axis orthogonal to the Z-axis and X-axis is a Y-axis.

The magnetic material plate 212 has a plate shape with a hole formed in a central portion of the magnetic material plate 212, and is formed of a magnetic material. The magnetic material plate 212 is, for example, a plate-shaped member formed of a ferrite that is a composite oxide of an iron oxide and a metal. Note that the magnetic material plate 212 may be composed of an aggregate of a plurality of magnetic material pieces, and the magnetic material pieces may be arranged in a frame shape, with an opening portion provided in a central portion of the arranged magnetic material pieces.

The power supply apparatus 220 includes a power factor improvement circuit that improves the power factor of the commercial AC power that is supplied by the commercial power source 400; and an inverter circuit that generates AC power which is supplied to the power transmission coil 211. The power factor improvement circuit rectifies and boosts the AC power generated by the commercial power source 400, and converts the AC power to DC power having a preset voltage value. The inverter circuit converts the DC power, which is generated by the conversion of electric power by the power factor improvement circuit, to AC power having a preset frequency. The power transmission apparatus 200 is fixed to, for example, the floor surface of a parking lot.

The power receiving apparatus 300 is an apparatus which wirelessly receives electric power from the power transmission apparatus 200 by magnetic coupling. The power receiving apparatus 300 includes a power receiving coil unit 310 that receives AC power transmitted by the power transmission apparatus 200; and a rectification circuit 320 that converts the AC power supplied from the power receiving coil unit 310 to DC power, and supplies the DC power to the rechargeable battery 500.

As illustrated in FIG. 2, the power receiving coil unit 310 includes a power receiving coil 311 that induces electromotive force in accordance with a variation of the alternating magnetic flux Φ induced by the power transmission coil 211; and a magnetic material plate 312 that passes magnetic force generated by the power receiving coil 311 and suppresses a loss of the magnetic force. The power receiving coil 311 is composed such that a lead wire is spirally wound around a coil axis 313 on the magnetic material plate 312. The power receiving coil 311 and capacitors provided at both ends of the power receiving coil 311 constitute a resonance circuit.

In the state in which the electric vehicle 700 is at rest in a preset position, the power receiving coil 311 is opposed to the power transmission coil 211. If the power transmission coil 211 receives electric power from the power supply apparatus 220 and induces an alternating magnetic flux Φ, the alternating magnetic flux Φ is interlinked with the power receiving coil 311, and thereby induced electromotive force is induced in the power receiving coil 311.

The magnetic material plate 312 is plate-shaped member with a hole formed in a central portion of the magnetic material plate 312, and is formed of a magnetic material. The magnetic material plate 312 is, for example, a plate-shaped member formed of a ferrite that is a composite oxide of an iron oxide and a metal. Note that the magnetic material plate 312 may be composed of an aggregate of a plurality of magnetic material pieces, and the magnetic material pieces may be arranged in a frame shape, with an opening portion provided in a central portion of the arranged magnetic material pieces.

The rectification circuit 320 rectifies the electromotive force induced in the power receiving coil 311, and generates DC power. The DC power generated by the rectification circuit 320 is supplied to the rechargeable battery 500. Note that the power receiving apparatus 300 may include, between the rectification circuit 320 and the rechargeable battery 500, a charge circuit that converts the DC power supplied from the rectification circuit 320 to appropriate DC power for charging the rechargeable battery 500. The power receiving apparatus 300 is fixed to, for example, the chassis of the electric vehicle 700.

The object detection apparatus 100 is an apparatus that detects an object existing within a detection range. The detection range is a range in which an object can be detected. The detection range is a region near the power transmission coil unit 210 and the power receiving coil unit 310. As objects that the object detection apparatus 100 detects, a living body and a metal piece are mainly conceivable. As living bodies, animal bodies of a dog, a cat and the like, as well as the human body, are conceivable.

If a living body exists within the detection range at the time of power transmission, there is a possibility that the living body is exposed to an electromagnetic field, and a health problem arises in the living body. In addition, if a metal piece exists within the detection range at the time of power transmission, there is a possibility that the metal piece adversely affects the power transmission, and generates heat. Thus, the object detection apparatus 100 detects an object existing within the detection range, and notifies a user that the object is detected. Upon receiving the notification, the user can move the object away from the detection range.

Figure 3:
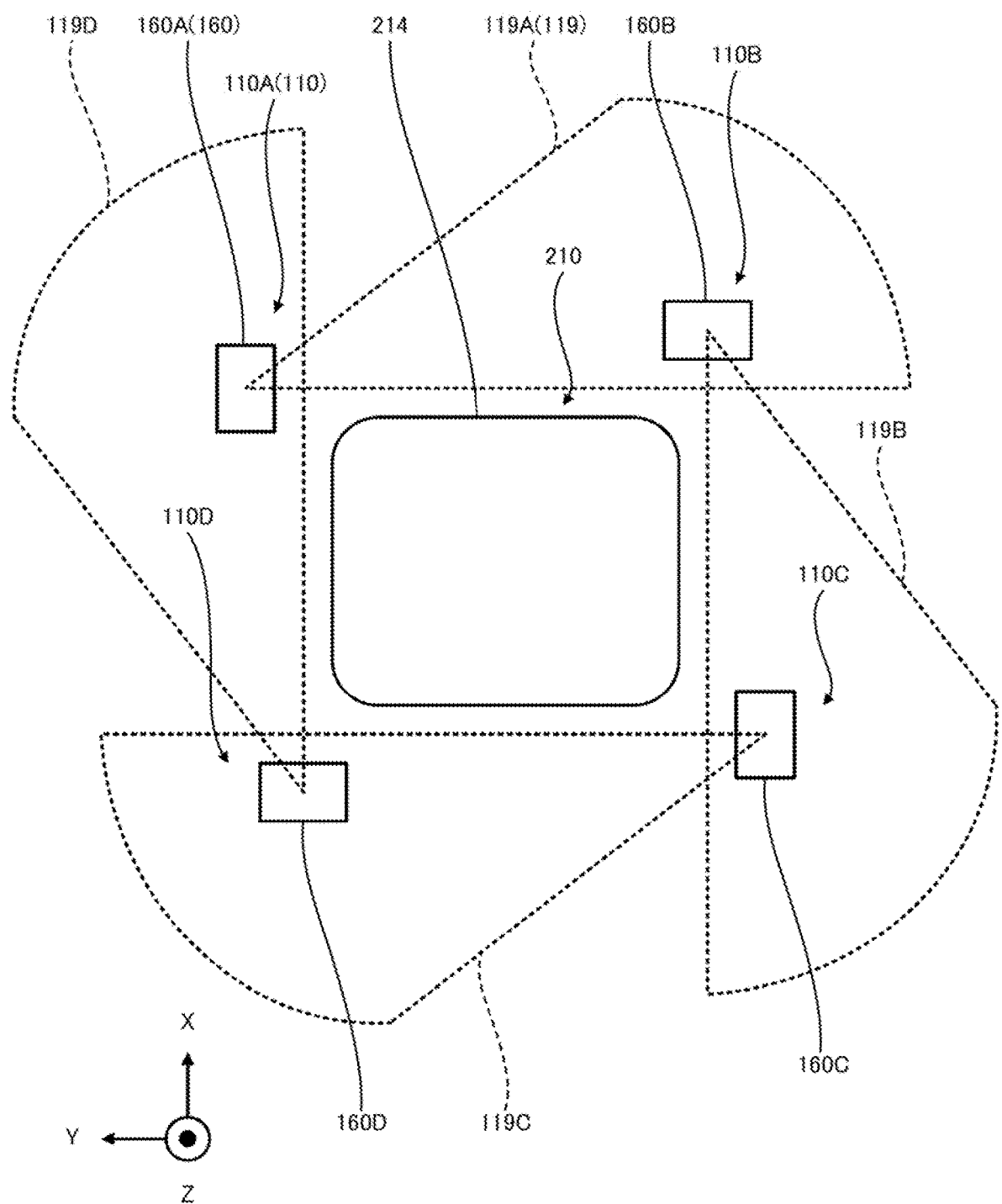
FIG. 3 is an arrangement diagram of sensor modules according to Embodiment 1.

In the present embodiment, the object detection apparatus 100 includes a plurality of sensor modules 110. Specifically, as illustrated in FIG. 3, the object detection apparatus 100 includes four sensor modules 110, namely a sensor module 110A, a sensor module 110B, a sensor module 110C, and a sensor module 110D. The sensor module 110 is a general term for the sensor module 110A, sensor module 110B, sensor module 110C and sensor module 110D. The structures and functions of the four sensor modules 110 are basically the same.

Figure 4:
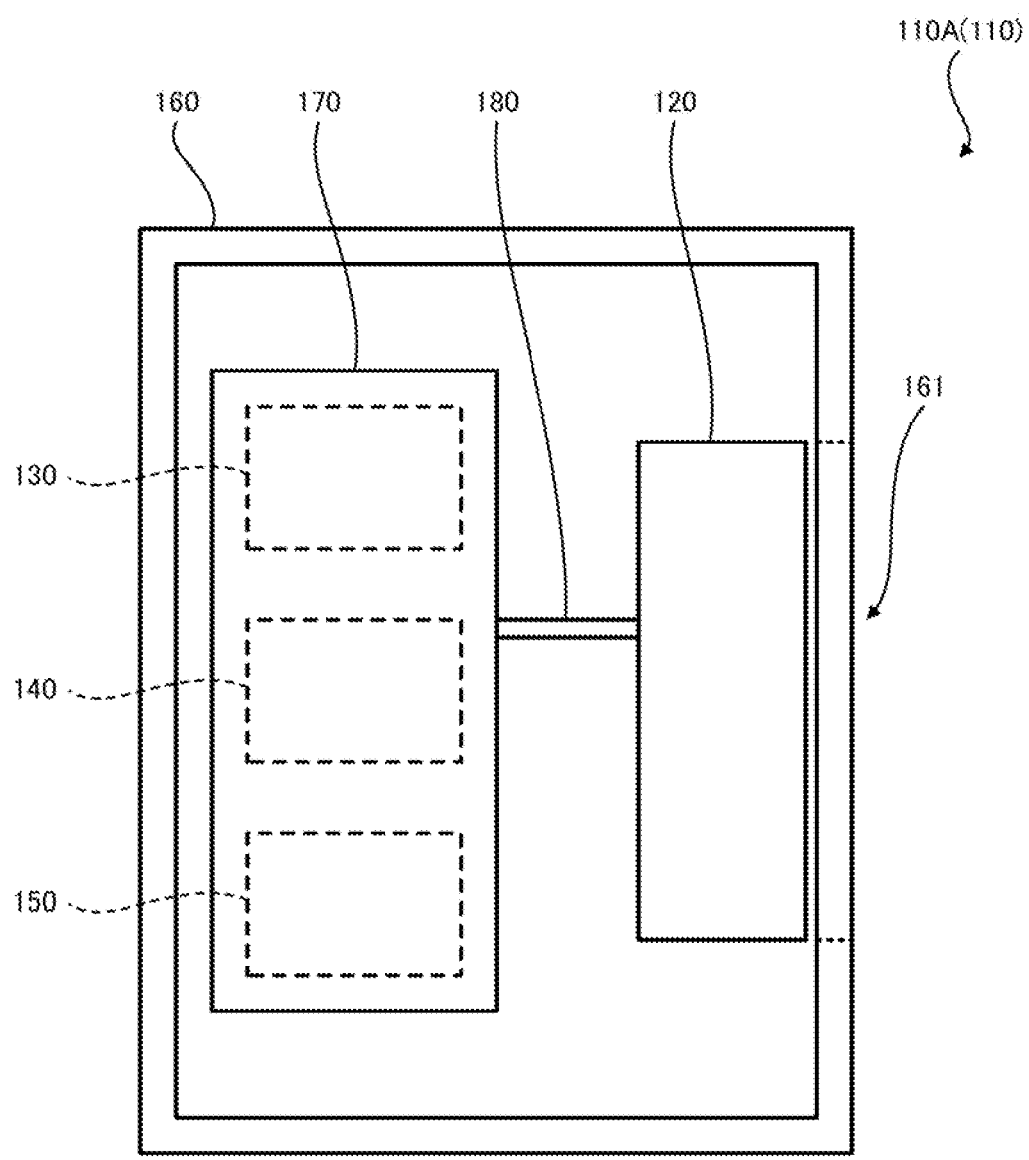
FIG. 4 is a top view of the sensor module according to Embodiment 1.

The sensor module 110 is a unit in which components used for detecting an object are integrated in one housing. Specifically, as illustrated in FIG. 4, the sensor module 110 includes a sensor 120 that detects an object; a housing 160 that accommodates the sensor 120 and a detection board 170; and the detection board 170 that is connected to the sensor 120 by a cable 180. In FIG. 4, for easier understanding, an illustration of a ceiling part of the housing 160 is omitted. In other words, FIG. 4 is a top view of the sensor module 110 at a time when the ceiling portion of the housing 160 is removed.

The sensor 120 is a sensor that detects an object existing within the detection range. As the sensor 120, various types of sensors, such as a sensor that detects a reflective wave of a sound wave or an electromagnetic wave, and a sensor that detects an electromagnetic wave, can be adopted. For example, as the sensor 120, an ultrasonic sensor, a millimeter-wave sensor, an X-band sensor, an infrared sensor, and a visible-light sensor can be adopted. In the present embodiment, the sensor 120 is an ultrasonic sensor that transmits an ultrasonic wave by a transmitter, and receives a reflective wave of the ultrasonic wave by a receiver. Hereinafter, the ultrasonic wave that the transmitter transmits is referred to as a transmission wave, where appropriate.

The sensor 120 includes a piezoelectric element and a housing that accommodates the piezoelectric element. The sensor 120 executes sensing in accordance with control by a controller 130. The sensor 120 applies a voltage pulse, which is supplied from the controller 130, to the piezoelectric element, and transmits an ultrasonic wave from the piezoelectric element. In addition, the sensor 120 supplies to the controller 130 a voltage signal indicative of a voltage generated in the piezoelectric element by a reflective wave.

The housing 160 accommodates the sensor 120 and the detection board 170. The housing 160 is, for example, a box-shaped member including an opening portion 161 in a position opposed to the sensor 120. The housing 160 functions as a reference object for other sensor modules 110. The reference object is used in order to correct at least one of a parameter for the sensor 120 or output information based on a signal that is output by the sensor 120, such that even if the environment, degradation state or the like of the sensor 120 has changed, the object can appropriately be detected. The environment of the sensor 120 is an ambient temperature, humidity, light quantity, wind velocity, and the like. The degradation state of the sensor 120 depends on, for example, the age of service of the sensor 120.

Here, even if the condition of presence of an object is the same, if the environment of the sensor 120 is different, there is a possibility that a signal that is output by the sensor 120 becomes different, and there is a possibility that output information based on this signal becomes different. For example, when the sensor 120 is an ultrasonic sensor using a piezoelectric element, the resonance frequency is determined by the structure of the ultrasonic sensor. If the temperature varies and the ultrasonic sensor expands or contracts, the resonance frequency varies, and the signal that is output by the sensor 120 and the output information based on this signal become different. Similarly, even if the condition of presence of an object is the same, if the degradation state of the sensor 120 is different, there is a possibility that the signal that is output by the sensor 120 and the output information based on this signal become different. Thus, the sensor module 110 detects, as a reference object, the housing 160 of another sensor module 110, such that the detection result of an object does not differ depending on the variation of the environment or degradation state of the sensor 120.

It is preferable that the reference object is an object that is at rest while the power transmission coil unit 210 is transmitting electric power. It is preferable that the reference object is a part of an object that constitutes the power transmission apparatus 200. In the present embodiment, the reference object is a part of an object that constitutes the object detection apparatus 100 included in the power transmission apparatus 200. It is preferable that the housing 160 that is the reference object is composed of a material that is easily detected by another sensor 120. The housing 160 is composed of, for example, a metal.

A plurality of sensor modules 110 is arranged such that at least one part of at least one other sensor module 110 is included within the detection range of the sensor 120 included in each of the sensor modules 110. According to this structure, at least one part of at least one other sensor module 110, which exists within the detection range of the sensor 120 included in each sensor module 110, can be used as the reference object.

Specifically, as illustrated in FIG. 3, the sensor modules 110 are arranged around the housing 214 that the power transmission coil unit 210 includes, such that the housing 160 of one other sensor 120 is included in a detection range 119 of each sensor 120. In the Example illustrated in FIG. 3, a housing 160B of the sensor 120 included in the sensor module 110B is included in a detection range 119A of the sensor 120 included in the sensor module 110A. In addition, a housing 160C of the sensor 120 included in the sensor module 110C is included in a detection range 119B of the sensor 120 included in the sensor module 110B.

A housing 160D of the sensor 120 included in the sensor module 110D is included in a detection range 119C of the sensor 120 included in the sensor module 110C. A housing 160A of the sensor 120 included in the sensor module 110A is included in a detection range 119D of the sensor 120 included in the sensor module 110D. Note that the detection range 119 is a general term for the detection range 119A, detection range 119B, detection range 119C and detection range 119D. In addition, the housing 160 is a general term for the housing 160A, housing 160B, housing 160C and housing 160D.

The detection board 170 is a board on which components for executing various processes involved in the detection of an object are mounted. A central processing unit (CPU), a read-only memory (ROM), a random access memory (RAM), a real time clock (RTC), an analog/digital (A/D) converter, a flash memory, a communication interface, and the like are mounted on the detection board 170. The communication interface is a communication interface that supports, for example, well-known wired communication standards such as a universal serial bus (USB) (trademark) and Thunderbolt (trademark), or well-known wireless communication standards such as Wi-Fi (trademark), Bluetooth (trademark), long term evolution (LTE), 4th generation (4G), and 5th generation (5G). A controller 130, a storage 140, and a communicator 150, which will be described later, are implemented by these structural components mounted on the detection board 170.

Figure 5:
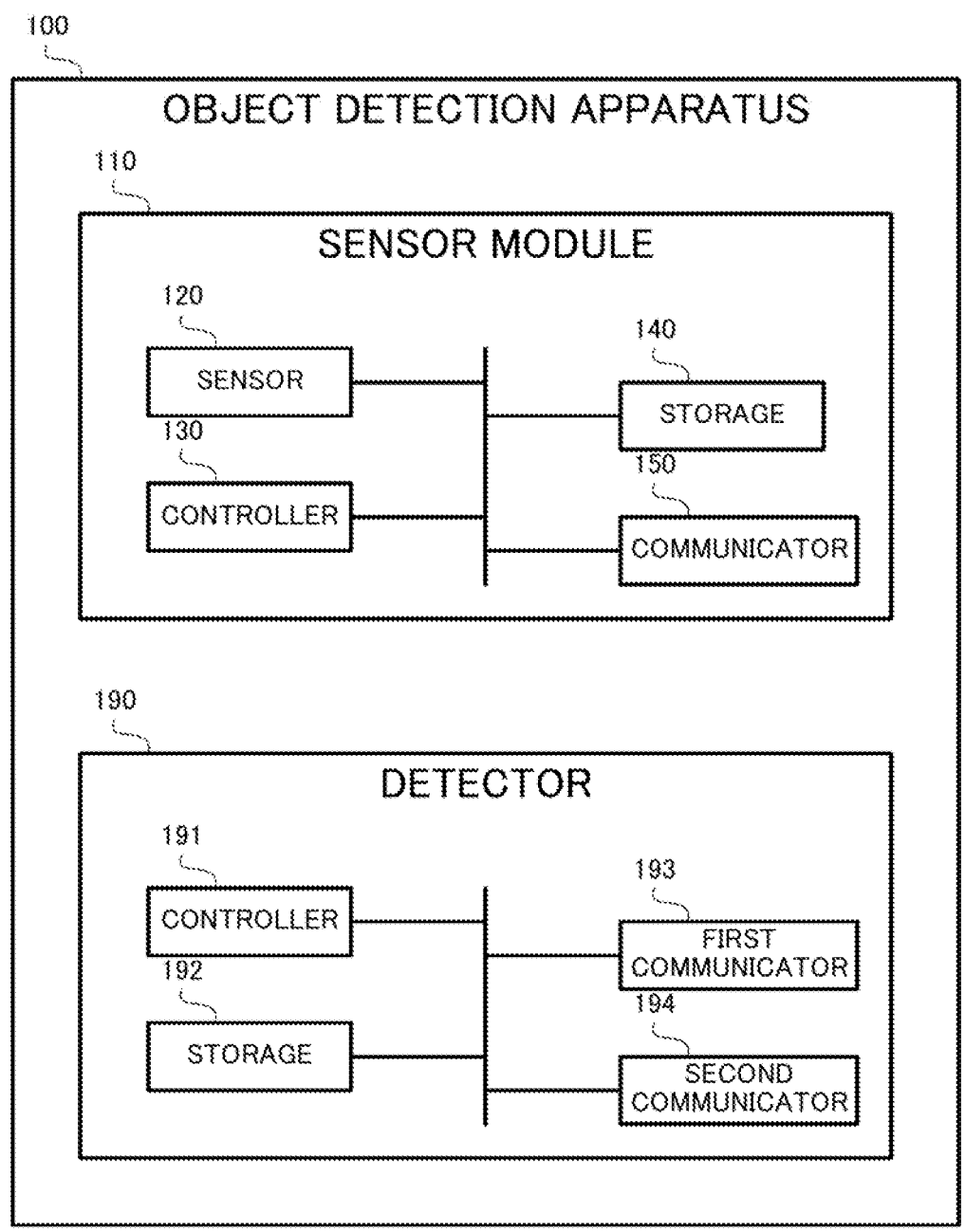
FIG. 5 is a configuration diagram of an object detection apparatus according to Embodiment 1.

Next, referring to FIG. 5, a configuration of the object detection apparatus 100 will be described. The object detection apparatus 100 includes a plurality of sensor modules 110, and a detector 190. Note that FIG. 5 explicitly illustrates only one sensor module 110. The sensor module 110 includes a sensor 120, a controller 130, a storage 140, and a communicator 150. The detector 190 includes a controller 191, a storage 192, a first communicator 193, and a second communicator 194. The detector 190 is provided outside the sensor module 110. For example, the detector 190 is provided in the inside of the housing of the power transmission coil unit 210 or power supply apparatus 220.

The controller 130 controls the operation of the entirety of the sensor module 110. The controller 130 controls the sensor 120 according to an operation program stored in the storage 140, and generates output information, based on a signal that the sensor 120 outputs. The controller 130 includes, for example, a CPU, a ROM, a RAM, an RTC, an A/D converter, and the like.

The storage 140 stores operation programs and data, which are used for the controller 130 to execute various processes. For example, the storage 140 stores parameters for the sensor 120. As the parameters, various kinds of parameters are conceivable. In the present embodiment, as the parameters, an amplitude of a transmission wave that is transmitted by the sensor 120, and a frequency of a transmission wave that is transmitted by the sensor 120, are adopted. Note that the amplitude of the transmission wave is also referred to as a strength of a transmission wave, or a magnitude of a transmission wave. Note that in the present embodiment, a value of a parameter is simply referred to as a parameter, where appropriate. In addition, the storage 140 stores data that the controller 130 generates or acquires by executing various processes. For example, the storage 140 stores output information acquired by the controller 130. The storage 140 includes, for example, a flash memory.

The communicator 150 is a communication interface for communicating with the detector 190. The communicator 150 includes a communication interface that supports a well-known wired communication standard, or includes a communication interface that supports a well-known wireless communication standard.

The controller 191 controls the operation of the entirety of the detector 190. The controller 191 acquires output information from the sensor 120 according to an operation program stored in the storage 192, and detects an object, based on the output information. The controller 191 includes, for example, a CPU, a ROM, a RAM, an RTC, an A/D converter, and the like.

The storage 192 stores operation programs and data, which are used for the controller 191 to execute various processes. For example, the storage 192 stores parameters for the sensor 120. In addition, the storage 192 stores reference information. The reference information is output information acquired from a signal that the sensor 120 outputs when detecting a reference object, in an environment that serves as a reference, or in a degradation state that serves as a reference. In addition, the storage 192 stores data that the controller 191 generates or acquires by executing various processes. For example, the storage 192 stores output information acquired by the controller 191, a correction coefficient calculated from reference object information and reference information, and a correction amount calculated from the reference object information and reference information. The storage 192 includes, for example, a flash memory.

The first communicator 193 is a communication interface for communicating with the sensor module 110. The first communicator 193 includes a communication interface that supports a well-known wired communication standard, or includes a communication interface that supports a well-known wireless communication standard. The second communicator 194 is a communication interface for communicating with the power transmission coil unit 210, the power supply apparatus 220, an external terminal apparatus (not shown), and the like. The second communicator 194 includes a communication interface that supports a well-known wired communication standard, or includes a communication interface that supports a well-known wireless communication standard.

Figure 6:
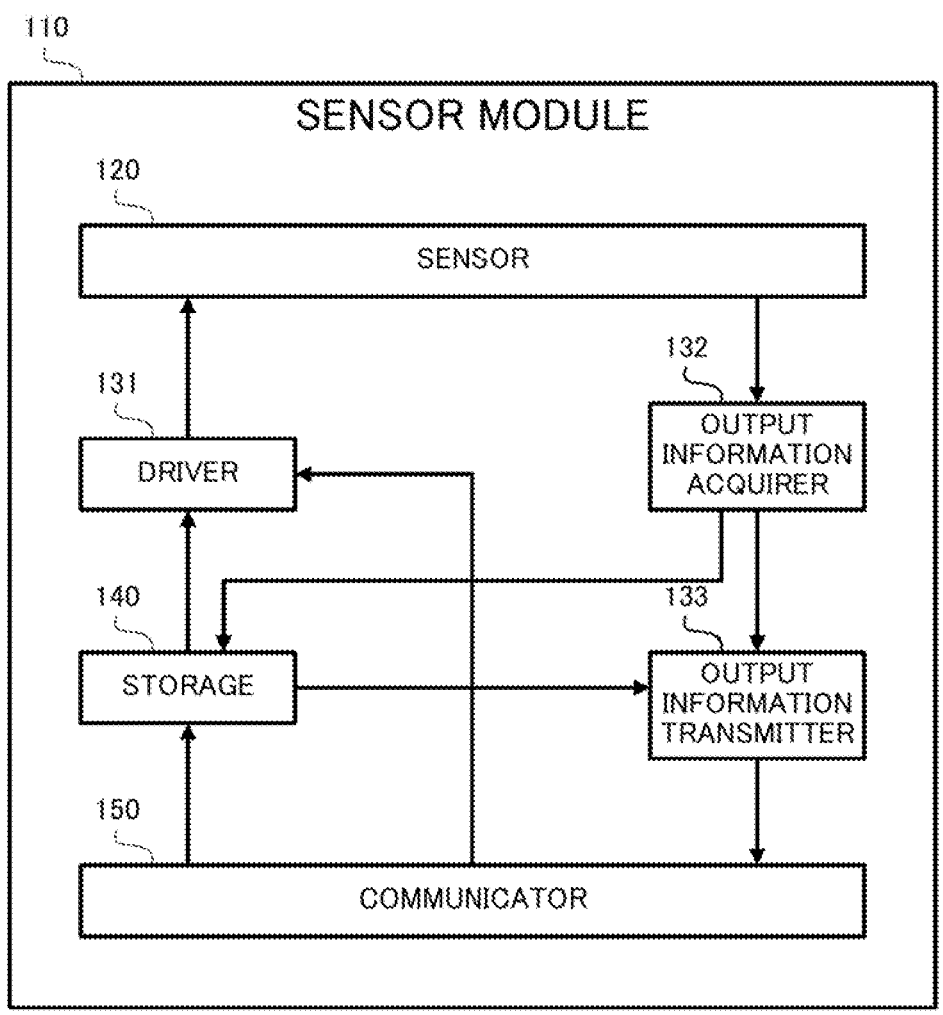
FIG. 6 is a functional configuration diagram of the sensor module according to Embodiment 1.

Next, referring to FIG. 6, the function of the sensor module 110 will be described. The sensor module 110 functionally includes a driver 131, an output information acquirer 132, and a output information transmitter 133. The driver 131, the output information acquirer 132 and the output information transmitter 133 are implemented by the function of the controller 130. Specifically, the driver 131, the output information acquirer 132 and the output information transmitter 133 are implemented by a computer executing operation programs stored in the ROM or a flash memory, the computer including a CPU, a ROM, a RAM, an RTC, an A/D converter and the like.

The driver 131 drives the sensor 120 according to control by the detector 190. Specifically, the driver 131 supplies to the sensor 120 a voltage pulse for causing the sensor 120 to transmit a transmission wave of an amplitude and a frequency designated by the parameters stored in the storage 140.

The output information acquirer 132 generates output information indicative of a detection result of the sensor 120, based on a signal that the sensor 120 outputs. Specifically, the output information acquirer 132 executes an A/D conversion process and a filtering process on an analog signal that the sensor 120 outputs, and specifies a distance from the sensor 120 to an object, and an amplitude of a reflective wave. For example, the output information acquirer 132 specifies the distance from the sensor 120 to the object, based on a time from when the sensor 120 transmits a transmission wave to when the sensor 120 receives a reflective wave. In addition, the output information acquirer 132 specifies the amplitude of the reflective wave received by the sensor 120. Note that the amplitude of the reflective wave is also referred to as a strength of a reflective wave, or a magnitude of a reflective wave. The output information acquirer 132 outputs the output information including a value indicative of the specified distance and a value indicative of the specified amplitude. The output information acquired by the output information acquirer 132 is stored in the storage 140, where appropriate.

The output information transmitter 133 transmits the output information, which is acquired by the output information acquirer 132, to the detector 190 via the communicator 150. The output information transmitter 133 may transmit the output information to the detector 190 in accordance with a request by the detector 190, or may transmit the output information to the detector 190, responding to the acquisition of the output information by the output information acquirer 132.

Figure 7:
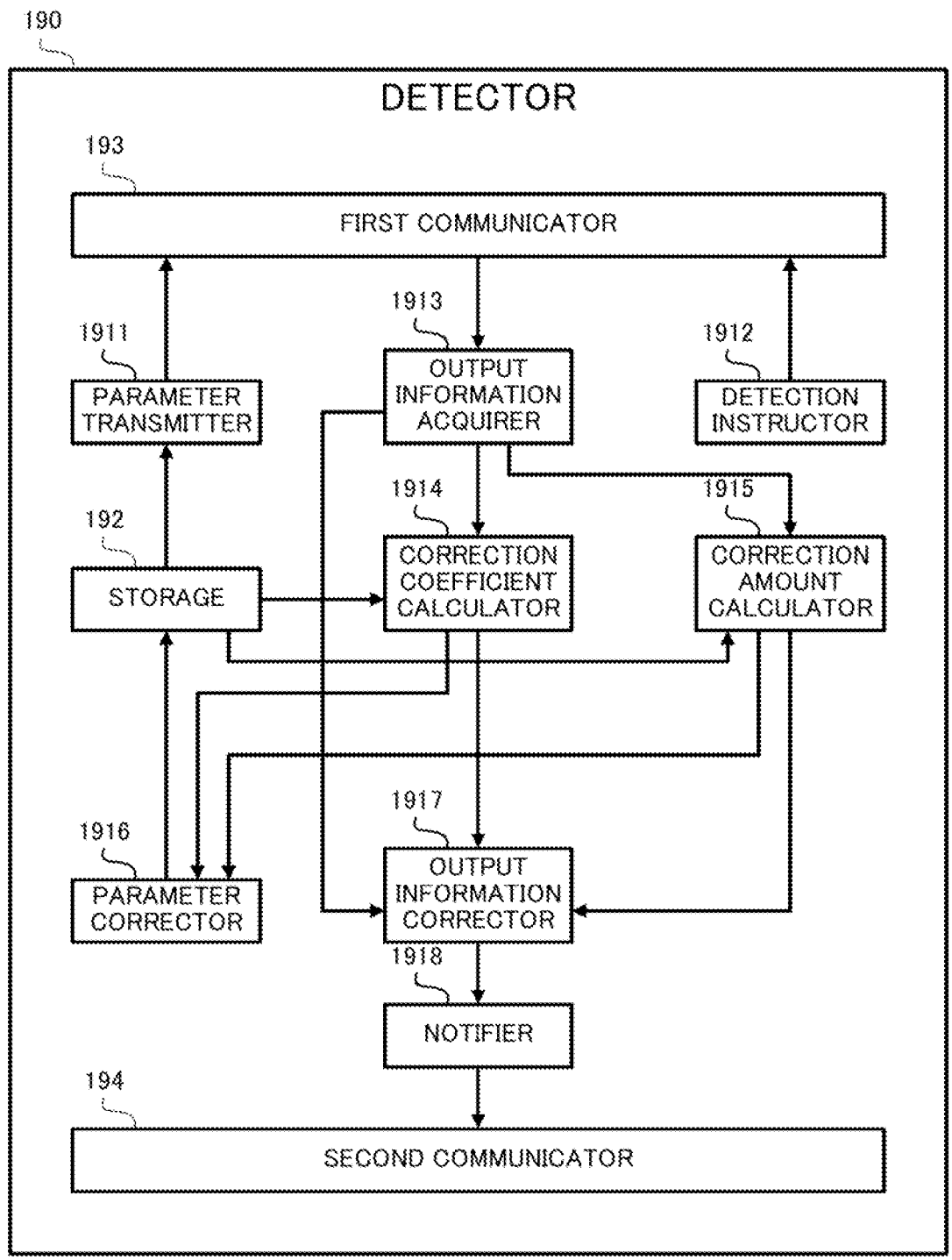
FIG. 7 is a functional configuration diagram of a detector according to Embodiment 1.

Next, referring to FIG. 7, the function of the detector 190 will be described. The detector 190 functionally includes a parameter transmitter 1911, a detection instructor 1912, an output information acquirer 1913, a correction coefficient calculator 1914, a correction amount calculator 1915, a parameter corrector 1916, an output information corrector 1917, and a notifier 1918. These functional components are implemented by the function of the controller 191. Specifically, these functional components are implemented by a computer executing operation programs stored in the ROM or a flash memory, the computer including a CPU, a ROM, a RAM, an RTC, an A/D converter and the like.

The parameter transmitter 1911 transmits the parameters stored in the storage 192 to the sensor module 110 via the first communicator 193. The detection instructor 1912 instructs the sensor module 110 to detect an object, via the first communicator 193. For example, the detection instructor 1912 instructs the sensor module 110 to detect an object, at a time of powering on the object detection apparatus 100, or at a time of receiving an instruction from the power transmission coil unit 210 or the power supply apparatus 220. The output information acquirer 1913 acquires the output information from the sensor module 110 via the first communicator 193.

The correction coefficient calculator 1914 calculates a correction coefficient that is used for correcting the parameters or the output information, based on the reference object information and the reference information. The correction amount calculator 1915 calculates a correction amount that is used for correcting the parameters or the output information, based on the reference object information and the reference information. Here, for the correction of one parameter, use is made of either the correction coefficient or the correction amount, which is predetermined according to the kind of the parameter. Similarly, for the correction of one output value included in the output information, use is made of either the correction coefficient or the correction amount, which is predetermined according to the kind of the output value.

For example, a parameter that is suited to correction by a ratio to a reference value is corrected by the correction coefficient. On the other hand, a parameter that is suited to correction by an offset amount to a reference value is corrected by the correction amount. In addition, an output value that is suited to correction by a ratio to a reference value is corrected by the correction coefficient. On the other hand, an output value that is suited to correction by an offset amount to a reference value is corrected by the correction amount. In the present embodiment, the parameter that is the amplitude of the transmission wave is corrected by the correction coefficient, and the output value that is the distance from the sensor 120 to the object is corrected by the correction amount.

The parameter corrector 1916 corrects the parameter for the sensor 120, based on the correction coefficient calculated by the correction coefficient calculator 1914, or the correction amount calculated by the correction amount calculator 1915. The output information corrector 1917 corrects the output information acquired by the output information acquirer 1913, based on the correction coefficient calculated by the correction coefficient calculator 1914, or the correction amount calculated by the correction amount calculator 1915.

The notifier 1918 executes various notification processes, based on the output information acquired by the output information acquirer 1913, or the output information corrected by the output information corrector 1917. For example, when the reference object is not successively detected a predetermined number of times, the notifier 1918 makes notification indicating the occurrence of an abnormality. In addition, for example, when an object other than the reference object is successively detected a predetermined number of times, the notifier 1918 makes notification indicating the presence of an object other than the reference object. Note that the destination of notification is the power transmission coil unit 210, the power supply apparatus 220, a terminal apparatus (not shown), or the like.

Next, referring to FIG. 8 and FIG. 9, the process of the detector 190 will concretely be described. FIG. 8 is a diagram illustrating the reference information stored in the storage 192. FIG. 9 is a diagram illustrating the output information acquired by the output information acquirer 1913. As described above, the reference information is output information acquired from a signal that the sensor 120 outputs when detecting a reference object, in an environment that serves as a reference, or in a degradation state that serves as a reference. The reference information is set based on a result of an experiment, simulation or the like, and is stored in the storage 192 in advance. The reference information is information including output values, and is also referred to as reference data. The output information is information including output values, and is also referred to as output data.

The reference information illustrated in FIG. 8 is information indicating that the distance (hereinafter referred to as "detection distance" where appropriate) from the sensor 120 to the reference object is 100 (mm), and the amplitude (hereinafter referred to as "detection amplitude" where appropriate) of the reflective wave to be detected is 1000 (mV). Specifically, this reference information is information including 100 (mm) as an output value that is the detection distance, and including 1000 (mV) as an output value that is the detection amplitude. This reference information indicates that, in an environment serving as a reference, and in a degradation state serving as a reference, the output information including 100 (mm) as an output value that is the detection distance, and including 1000 (mV) as an output value that is the detection amplitude is acquired. Note that the detection amplitude that is the amplitude of a reflective wave depends on the size of the object, the quality of material of the surface of the object, the angle of the surface of the object, and the like.

The output information illustrated in FIG. 9 is information indicating, by three records, that three objects are detected. A first record, which is a record with a record No. 1, indicates that an object corresponding to an amplitude of 900 (mV) is detected at a position of 95 (mm) from the sensor 120. A second record, which is a record with a record No. 2, indicates that an object corresponding to an amplitude of 1800 (mV) is detected at a position of 495 (mm) from the sensor 120. A third record, which is a record with a record No. 3, indicates that an object corresponding to an amplitude of 90 (mV) is detected at a position of 995 (mm) from the sensor 120.

Here, the detector 190 executes a reference object detection process of detecting a reference object existing at a predetermined position within the detection range, by comparing the output information and predetermined reference information. Specifically, the detector 190 determines whether a reference object-related record, which is a record including output values approximate to the output values included in the reference information, is included in the output information. If the detector 190 determines that the reference object-related record is included in the output information, the detector 190 determines that the reference object is detected. On the other hand, if the detector 190 determines that the reference object-related record is not included in the output information, the detector 190 determines that the reference object is not detected.

Note that the method of determining whether a specific record is the reference object-related record can be adjusted as appropriate. For example, with respect to all kinds of output values, when differences between the output values included in the reference information and the output values included in a specific record are equal to or less than predetermined values, it can be determined that the specific record is a reference object-related record. Alternatively, with respect to all kinds of output values, when the ratios of the output values included in the specific record to the output values included in the reference information are within the range of preset ratios, it can be determined that the specific record is the reference object-related record.

For example, it is assumed that the threshold of a difference of the detection distance is 10 (mm) and the range of the ratio of the detection amplitude is 0.8 to 1.2. When the reference information includes 100 (mm) as the detection distance and includes 1000 (mV) as the detection amplitude, a record including the detection distance in the range of 90 (mm) to 110 (mm) and the detection amplitude in the range of 800 (mV) to 1200 (mV) is the reference object-related record. Since the record with the record No. 1 is a record including the detection distance of 95 (mm) and the detection amplitude of 900 (mV), this record is the reference object-related record.

Specifically, the output information illustrated in FIG. 9 indicates that one object that is a reference object, and two objects that are other than the reference object, are detected. Note that the object other than the reference object is referred to as a detection target, where appropriate. In addition, information indicative of the reference object in the output information is referred to as reference object information, where appropriate. Besides, information indicative of the detection target in the output information is referred to as detection target information, where appropriate.

When the reference object is detected, the detector 190 executes a correction process of correcting at least one of the output information or the parameter for the sensor 120, based on the reference information and the reference object information that is the information indicative of the reference object in the output information. For example, when the output information can indirectly be adjusted by the correction of the parameter, the detector 190 corrects the parameter. On the other hand, when the output information cannot indirectly be adjusted by the correction of the parameter, the detector 190 corrects the output information. In the present embodiment, the detector 190 corrects, in the correction process, the output information and the parameter, based on the reference object information and the reference information.

In the present embodiment, the parameters for the sensor 120 include a first parameter and a second parameter, and the output information includes a first output value and a second output value. The first parameter is a parameter that affects the first output value. The second parameter may be a parameter that affects the first output value and the second output value, or may be a parameter that does not affect the first output value or the second output value. The first output value is an output value that varies by the correction of the first parameter. The second output value is an output value that does not vary by the correction of the first parameter.

Here, the detector 190 corrects, in the correction process, the second output value of the output information and the first parameter of the parameters, based on the reference object information and the reference information. The first parameter is the amplitude of the transmission wave, the second parameter is the frequency of the transmission wave, the first output value is the detection amplitude, and the second output value is the detection distance. Specifically, the detector 190 corrects the detection distance of the output information, and the amplitude of the transmission wave of the parameters.

If the amplitude of the transmission wave transmitted by the sensor 120 is varied, the detection amplitude included in the acquired output information varies. On the other hand, even if the amplitude of the transmission wave transmitted by the sensor 120 and the frequency of this transmission wave are varied, the detection distance included in the acquired output information does not vary. Specifically, the detection amplitude can be adjusted by the correction of the parameter, but the detection distance cannot be adjusted by the correction of the parameter. Thus, the detection amplitude is adjusted by the correction of the parameter, and the detection distance is adjusted by the correction of the output information.

For example, the detection amplitude included in the reference information is 1000 (mV), and the detection amplitude included in the reference object information is 900 (mV). Specifically, the present condition is a condition in which, compared to the condition serving as a reference, the detection amplitude is detected as an amplitude corresponding to multiplication by 900/1000=0.9. Thus, the amplitude of the transmission wave is corrected such that the detection amplitude is detected as an amplitude of substantially the same level as in the condition serving as the reference. For example, the amplitude of the transmission wave is corrected to a value corresponding to 10/9 times the present amplitude. By the correction of the amplitude of the transmission wave, the detection amplitude included in the output information is adjusted to a proper value.

After the correction of the amplitude of the transmission wave, it is expected that the output information is so adjusted as to include a first record including 900×10/9=1000 (mV) as the detection amplitude, a second record including 1800×10/9=2000 (mV) as the detection amplitude, and a third record including 90×10/9=100 (mV) as the detection amplitude. Note that information indicative of the correspondence relation between the variation amount of the parameter and the variation amount of the output value included in the output information is stored, for example, in the storage 192. For example, information indicative of the correspondence relation between the variation amount of the amplitude of the transmission wave and the variation amount of an estimated detection amplitude is stored in the storage 192.

In addition, the detection distance included in the reference information is 100 (mm), and the detection distance included in the reference object information is 95 (mm). Specifically, the present condition is a condition in which, compared to the condition serving as a reference, the detection distance is detected as a length that is shorter by 100−95=5 (mm). Thus, the detection distance included in the output information is corrected in order to set the detection distance to a length that is substantially the same as in the condition serving as the reference. For example, the detection distance included in the output information is increased by 5 (mm). After the correction of the detection distance, the output information includes a first record including 95+5=100 (mm) as the detection distance, a second record including 495+5=500 (mm) as the detection distance, and a third record including 995+5=1000 (mm) as the detection distance.

In this manner, the detector 190 corrects, in the correction process, at least one of the output information or the parameter, based on the correction coefficient or correction amount, which is based on the reference object information and the reference information. In the above-described example, the correction coefficient is 10/9, and the correction amount is 5 (mm).

Here, the detector 190 repeatedly executes, in first cycles, the process of determining the presence or absence of an object. Then, if a reference object is detected in the reference object detection process, the detector 190 updates the correction coefficient or the correction amount in every second cycle, the second cycle being longer than the first cycle. Specifically, in the present embodiment, the cycle, in which the correction coefficient or the correction amount is updated, is longer than the cycle in which the process of determining the presence or absence of an object is executed.

Figure 10:
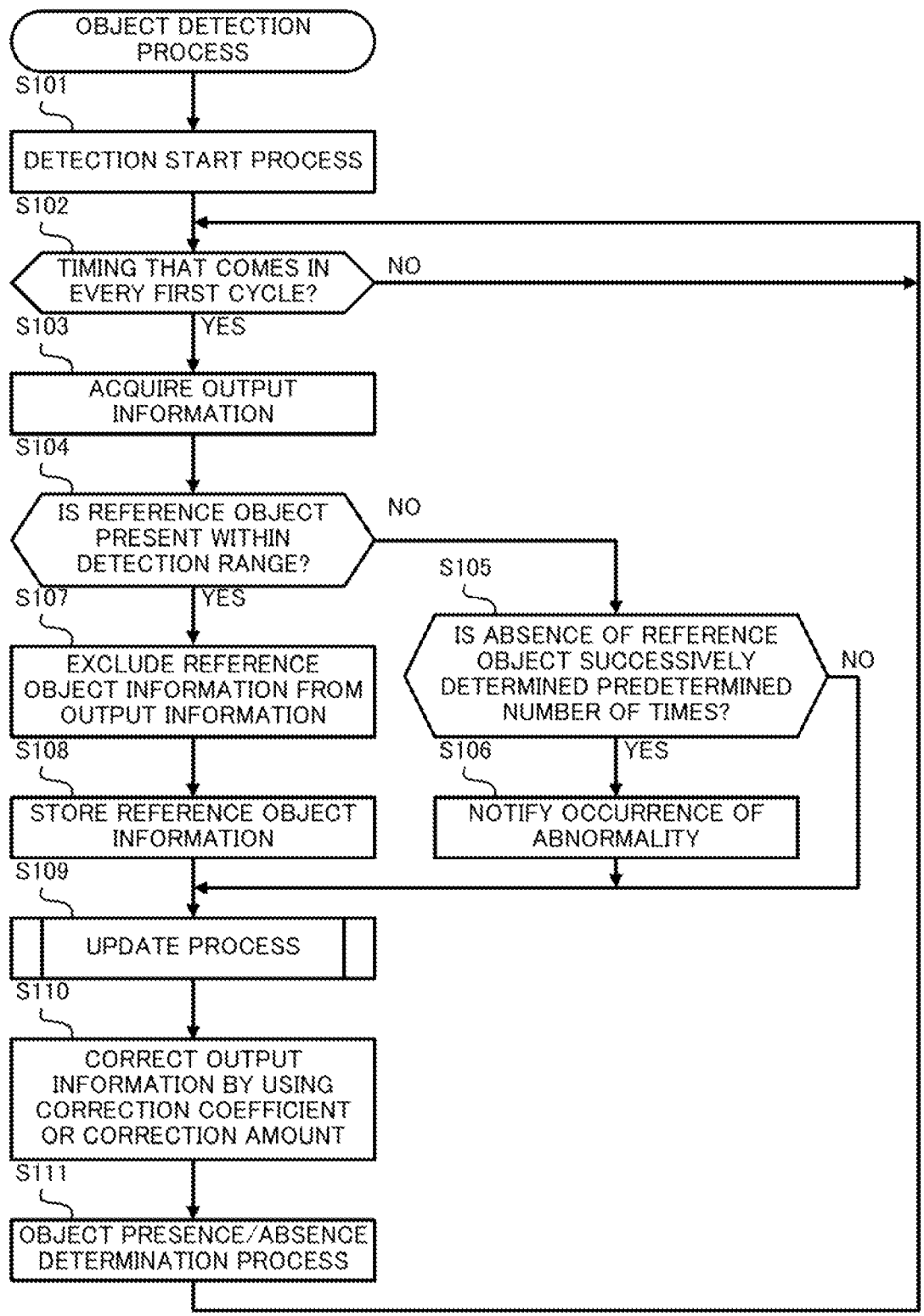
FIG. 10 is a flowchart illustrating an object detection process that the object detection apparatus according to Embodiment 1 executes.

Next, referring to FIG. 10, the object detection process that the object detection apparatus 100 executes will be described. The object detection process is, for example, repeatedly executed from when the electric vehicle 700 approaches the power transmission apparatus 200 until when the power transmission is finished. Note that the object detection apparatus 100 receives, from the power transmission apparatus 200, such notification that the electric vehicle 700 approached the power transmission apparatus 200, that the power transmission is started, that the power transmission is finished, and the like.

To start with, the detector 190 included in the object detection apparatus 100 starts a detection start process (step S101). Specifically, the detector 190 first transmits default values of the parameters stored in the storage 192 to the sensor module 110. Then, the detector 190 instructs the sensor module 110 to start the detection of an object. Thereafter, the sensor module 110 repeatedly executes, in first cycles, the process of detecting an object.

In the process of detecting the object, the controller 130 first supplies to the sensor 120 a voltage pulse for causing the sensor 120 to transmit a transmission wave of an amplitude and a frequency corresponding to the default values of the parameters. On the other hand, the sensor 120 transmits the transmission wave corresponding to the voltage pulse, and supplies a signal corresponding to a reflective wave of the transmission wave to the controller 130. The controller 130 generates output information, based on the signal supplied from the sensor 120. For example, the controller 130 specifies the distance from the sensor 120 to the object, based on the time from when the sensor 120 transmits a transmission wave to when the sensor 120 receives a reflective wave. In addition, the controller 130 specifies the amplitude of the received reflective wave. The controller 130 generates the output information including the detection distance that is the specified distance, and the detection amplitude that is the specified amplitude.

Upon completion of the process of step S101, the detector 190 determines whether the present time is a timing coming in every first cycle (step S102). The first cycle is a cycle in which the detector 190 acquires the output information from the sensor 120, and is a cycle in which the detector 190 determines the presence or absence of a detection target. In the present embodiment, the sensor module 110 automatically acquires the output information in every first cycle. Accordingly, in step S102, the detector 190 may determine whether the sensor module 110 has acquired new output information. If the detector 190 determines that the present time is not the timing coming in every first cycle (step S102: NO), the detector 190 returns the process to step S102.

On the other hand, if the detector 190 determines that the present time is the timing coming in every first cycle (step S102: YES), the detector 190 acquires the output information (step S103). Specifically, the detector 190 acquires the output information generated by the sensor module 110.

Upon completion of the process of step S103, the detector 190 determines whether a reference object exists within the detection range (step S104). In other words, the detector 190 determines whether a reference object-related record is included in the output information. If the detector 190 determines that the reference object does not exist within the detection range (step S104: NO), the detector 190 determines whether the absence of the reference object is successively determined a predetermined number of times (step S105). If the detector 190 determines that the absence of the reference object is successively determined a predetermined number of times (step S105: YES), the detector 190 notifies the occurrence of an abnormality (step S106).

For example, the detector 190 makes such notification that an abnormality occurs in the power transmission coil unit 210, power supply apparatus 220, the terminal apparatus, or the like. Note that, upon receiving such notification, the power transmission coil unit 210, power supply apparatus 220, the terminal apparatus, or the like executes an appropriate process. For example, upon receiving such notification, the power supply apparatus 220 may assume the occurrence of some abnormality and may stop the transmission of power.

If the detector 190 determines that the reference object exists within the detection range (step S104: YES), the detector 190 excludes the reference object information from the output information (step S107). The output information, from which the reference object information is excluded, is the detection target information. Upon completion of the process of step S107, the detector 190 stores the reference object information (step S108). For example, the detector 190 stores the reference object information in the storage 192.

If the detector 190 does not determine that the absence of the reference object is successively determined a predetermined number of times (step S105: NO), or if the process of step S106 or step S108 is completed, the detector 190 executes an update process (step S109). The update process will be described in detail with reference to a flowchart of FIG. 11.

To begin with, the detector 190 determines whether the present time is a timing coming in every second cycle (step S201). The second cycle is a cycle of updating the correction coefficient and the correction amount, and is a cycle that is longer than the first cycle. The second cycle is, for example, about 100 times longer than the first cycle. For example, when the first cycle is 10 msec, the second cycle is 1 sec. If the detector 190 determines that the present time is the timing coming in every second cycle (step S201: YES), the detector 190 determines whether the reference object is detected in the latest second cycle (step S202). For example, if at least one piece of reference object information is stored in the storage 192, the detector 190 determines that the reference object is detected in the latest second cycle.

If the detector 190 determines that the reference object is detected in the latest second cycle (step S202: YES), the detector 190 calculates a correction coefficient and a correction amount from the reference object information and the reference information (step S203). For example, the detector 190 calculates the correction coefficient, based on the ratio of the detection amplitude included in the reference information to the detection amplitude included in the reference object information. In addition, the detector 190 calculates, as the correction amount, the difference between the detection distance included in the reference object information and the detection distance included in the reference information. Note that when a plurality of pieces of reference object information is stored in the latest second cycle, the correction coefficient or the correction amount may be calculated based on the latest output value, or the correction coefficient or the correction amount may be calculated based on an average value of the output values.

Upon completion of the process of step S203, the detector 190 updates the correction coefficient and the correction amount (step S204). Note that the correction coefficient and the correction amount are stored, for example, in the storage 192. Upon completion of the process of step S204, the detector 190 corrects the parameter by using the correction coefficient or the correction amount (step S205). For example, the detector 190 sets, in the sensor module 110, a value that is calculated by multiplying the amplitude of the transmission wave, which is currently set in the sensor module 110, by the correction coefficient, as a new amplitude of the transmission wave.

Upon completion of the process of step S205, the detector 190 deletes the reference object information stored in the storage 192 (step S206). If the detector 190 determines that the present time is not the timing coming in every second cycle (step S201: NO), or if the detector 190 determines that the reference object is not detected in the latest second cycle (step S202: NO), or if the detector 190 completes the process of step S206, the detector 190 completes the update process.

Upon completion of the update process of step S109, the detector 190 corrects the output information by using the correction coefficient or the correction amount (step S110). Specifically, using the correction amount of the detection distance, the detector 190 corrects the detection distance included in the output information, that is, the detection distance included in the detection target information. Upon completion of the process of step S110, the detector 190 executes an object presence/absence determination process (step S111).

Specifically, the detector 190 determines the presence or absence of the detection target, based on the detection distance and the detection amplitude included in the corrected detection target information that is the corrected output information. For example, a case is assumed in which a minimum amplitude that is detected as a detection target is 500 (mV) and a maximum distance of a detection target is 2000 (mm). In this case, it is assumed that a record including a detection amplitude less than 500 (mV) and a record including a detection distance exceeding 2000 (mm) are not regarded as records indicative of the detection target.

For example, a case is assumed in which the corrected detection target information includes a second record including 500 (mm) as the detection distance and 2000 (mV) as the detection amplitude, and a third record including 1000 (mm) as the detection distance and 100 (mV) as the detection amplitude. In this case, the second record is regarded as a record indicative of the detection target, but the third record is not regarded as a record indicative of the detection target since the detection amplitude of the third record is less than the minimum amplitude. Accordingly, the detector 190 determines that one detection target indicated by the second record exists.

Note that the detector 190 can execute various processes, based on the detection result of the detection target. For example, if the detector 190 successively determines the presence of the detection target a predetermined number of times, the detector 190 can notify that the detection target is detected. The destination of the notification is the power transmission coil unit 210, power supply apparatus 220, the terminal apparatus (not shown), or the like. Upon completion of the process of step S111, the detector 190 returns the process to step S102.

In the present embodiment, when the reference object is detected, the correction process of correcting at least one of the output information or the parameter for the sensor is executed based on the reference object information and the reference information. Thus, according to the present embodiment, at the time of wireless power transmission, an object can be detected with high precision.

In addition, in the present embodiment, the output information and the parameter are corrected. Thus, according to the present embodiment, the information used for determining the presence or absence of the object can efficiently be adjusted.

In particular, in the present embodiment, the second output value, between the first output value that varies by the correction of the first parameter and the second output value that does not vary by the correction of the first parameter, and the first parameter are corrected. Thus, according to the present embodiment, all output values included in the output information can be adjusted without correcting, as much as possible, the output values included in the output information.

Additionally, in the present embodiment, the process of determining the presence or absence of an object is repeatedly executed in the first cycles, and, when a reference object is detected, the correction coefficient or correction amount is updated in every second cycle, the second cycle being longer than the first cycle. According to the present embodiment, the correction of the output information or the parameter can be realized with a small processing load.

Additionally, in the present embodiment, when a reference object is not successively detected a predetermined number of times, the occurrence of an abnormality is notified. Thus, according to the present embodiment, overlooking of a detection result, the precision of which is suspicious, can be suppressed.

Additionally, in the present embodiment, the reference object is at least one part of at least one other sensor module 110, which exists within the detection range of the sensor 120 included in each sensor module 110. Thus, according to the present embodiment, since there is no need to prepare, as a reference object, an object that is not necessary for the object detection apparatus 100, an increase in the number of components and an increase in cost can be suppressed.

Additionally, in the present embodiment, the reference object is an object that is at rest while the power transmission coil unit 210 is transmitting electric power. Thus, according to the present embodiment, the information used for determining the presence or absence of the object can be adjusted with high precision.

Additionally, in the present embodiment, the reference object is a part of an object that constitutes the power transmission apparatus 200. Thus, according to the present embodiment, since there is no need to prepare, as a reference object, an object that is not necessary for the power transmission apparatus 200, an increase in the number of components and an increase in cost can be suppressed.

Embodiment 2

In Embodiment 1, the example is described in which a plurality of sensor modules 110 and the power transmission coil unit 210 are separately disposed. In the present embodiment, an example is described in which a plurality of sensor modules 110 is accommodated in the housing 214 that the power transmission coil unit 210 includes. Note that the description of the same configuration and process as in Embodiment 1 is omitted or simplified.

Figure 12:
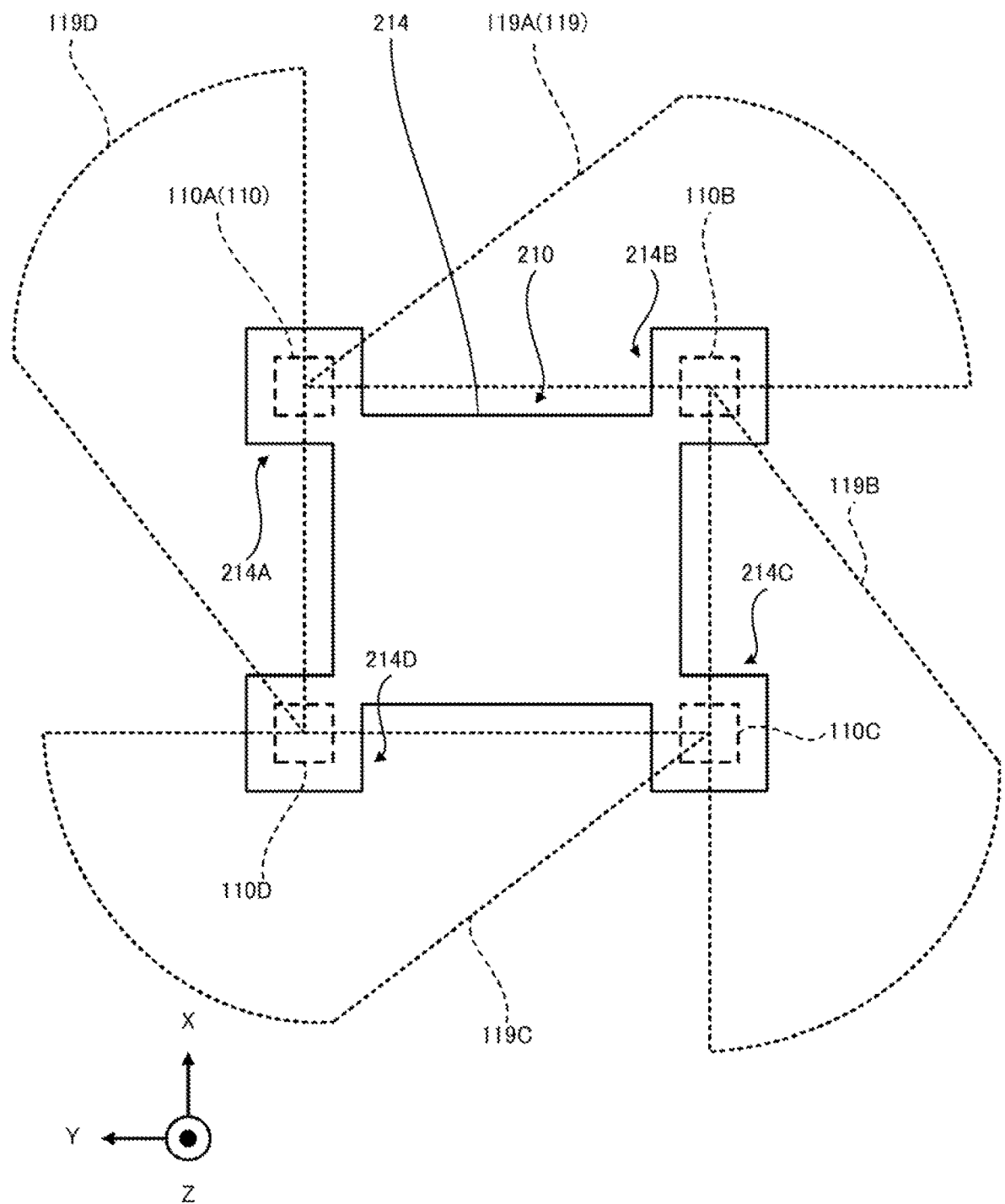
FIG. 12 is an arrangement diagram of sensor modules according to Embodiment 2.

FIG. 12 is an arrangement diagram of the sensor modules 110 according to the present embodiment. In the present embodiment, four sensor modules 110 are assembled in the inside of the housing 214 of the power transmission coil unit 210. Specifically, the four sensor modules 110 are accommodated in four corners of the housing 214 having a substantially rectangular shape in plan view. In the present embodiment, the housing 214 functions as housings of the four sensor modules 110, and the four sensor modules 110 do not include housings 160. Note that opening portions are provided in those parts of the housing 214, which transmission waves transmitted from the sensors 120 strike.

In addition, the four sensor modules 110 are arranged such that a part of the housing 214 is included in the detection range 119 of each sensor 120. In the example illustrated in FIG. 12, a part 214B of the housing 214 is included in the detection range 119A of the sensor 120 included in the sensor module 110A. Besides, a part 214C of the housing 214 is included in the detection range 119B of the sensor 120 included in the sensor module 110B. A part 214D of the housing 214 is included in the detection range 119C of the sensor 120 included in the sensor module 110C. A part 214A of the housing 214 is included in the detection range 119D of the sensor 120 included in the sensor module 110D. In the present embodiment, the part 214A, part 214B, part 214C and part 214D are reference objects.

In the present embodiment, a plurality of sensor modules 110 is accommodated in the housing 214 that the power transmission coil unit 210 includes. Thus, according to the present embodiment, the time and labor for arranging the sensor modules 110 can be reduced.

In addition, in the present embodiment, the reference object is a part of an object that constitutes the power transmission coil unit 210. Thus, according to the present embodiment, since there is no need to prepare, as a reference object, an object that is not necessary for the power transmission apparatus 200, an increase in the number of components and an increase in cost can be suppressed.

Additionally, in the present embodiment, the reference object is an object that is at rest while the power transmission coil unit 210 is transmitting electric power. Thus, according to the present embodiment, the information used for determining the presence or absence of the object can be adjusted with high precision.

Embodiment 3

In Embodiment 1, the example is described in which the reference object is at least one part of at least one other sensor module 110, which exists within the detection range of the sensor 120 included in each sensor module 110. In the present embodiment, an example is described in which the reference object is a part of a housing 224 of the power supply apparatus 220. Note that the description of the same configuration and process as in Embodiments 1 and 2 is omitted or simplified.

Figure 13:
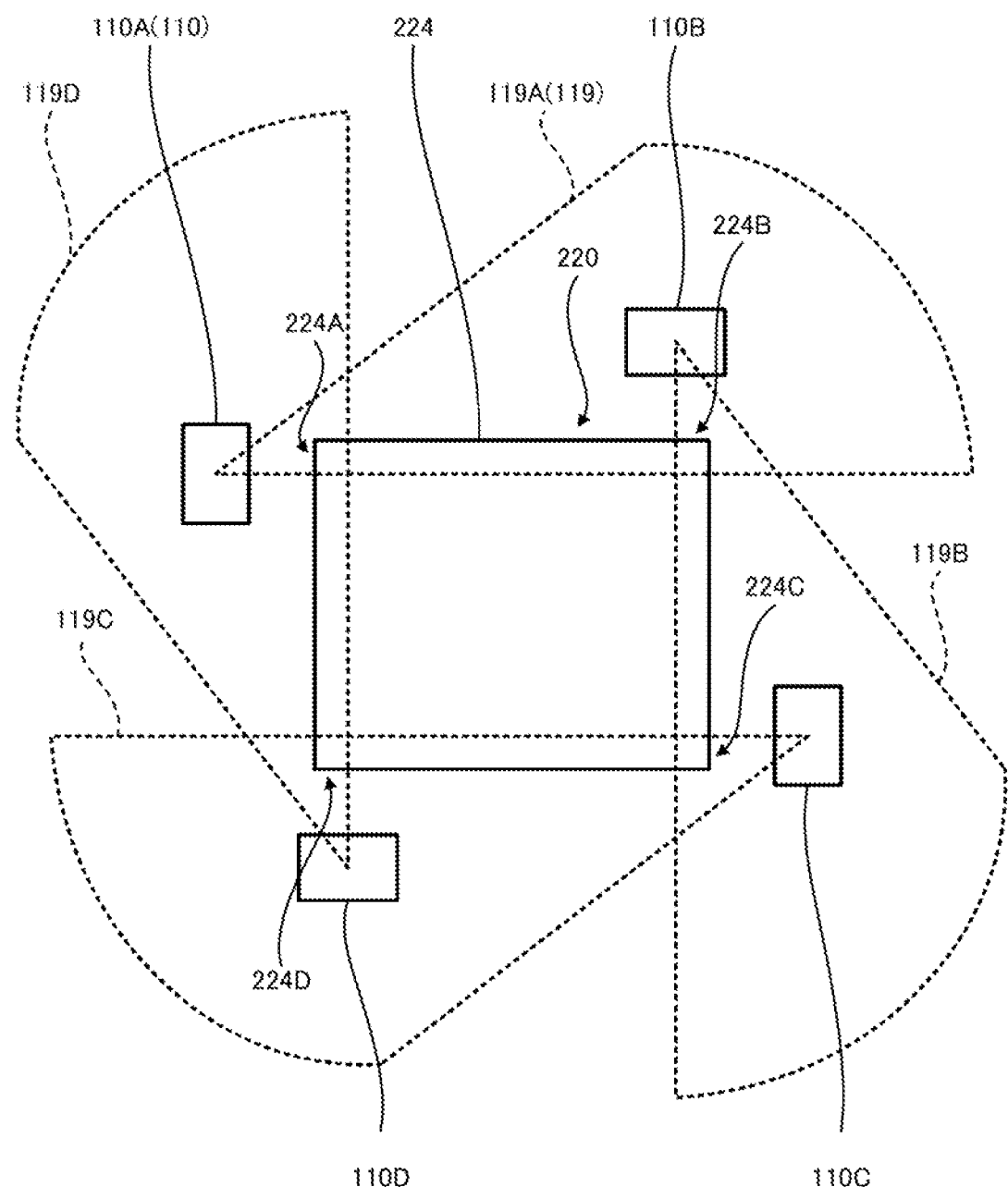
FIG. 13 is an arrangement diagram of sensor modules according to Embodiment 3.
Figure 13:
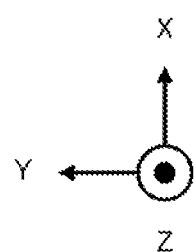

FIG. 13 is an arrangement diagram of the sensor modules 110 according to the present embodiment. In the present embodiment, four sensor modules 110 are provided near four corners of the housing 224 of the power supply apparatus 220, the housing 224 having a substantially rectangular shape in plan view. In the present embodiment, the four sensor modules 110 are arranged such that a part of the housing 224 is included in the detection range 119 of each sensor 120.

In the example illustrated in FIG. 13, a part 224A of the housing 224 is included in the detection range 119A of the sensor 120 included in the sensor module 110A. In addition, a part 224B of the housing 224 is included in the detection range 119B of the sensor 120 included in the sensor module 110B. A part 224C of the housing 224 is included in the detection range 119C of the sensor 120 included in the sensor module 110C. A part 224D of the housing 224 is included in the detection range 119D of the sensor 120 included in the sensor module 110D. In the present embodiment, the part 224A, part 224B, part 224C and part 224D are reference objects.

In the present embodiment, the reference object is a part of an object that constitutes the power transmission apparatus 200. Thus, according to the present embodiment, since there is no need to prepare, as a reference object, an object that is not necessary for the power transmission apparatus 200, an increase in the number of components and an increase in cost can be suppressed.

In addition, in the present embodiment, the reference object is an object that is at rest while the power transmission coil unit 210 is transmitting electric power. Thus, according to the present embodiment, the information used for determining the presence or absence of the object can be adjusted with high precision.

Embodiment 4

In Embodiment 1, the example is described in which the second cycle in which the correction coefficient or the correction amount is updated is longer than the first cycle in which the presence or absence of the detection target is determined. In the present embodiment, an example is described in which the first cycle and the second cycle are equal. Note that the description of the same configuration and process as in Embodiments 1 to 3 is omitted or simplified.

Figure 11:
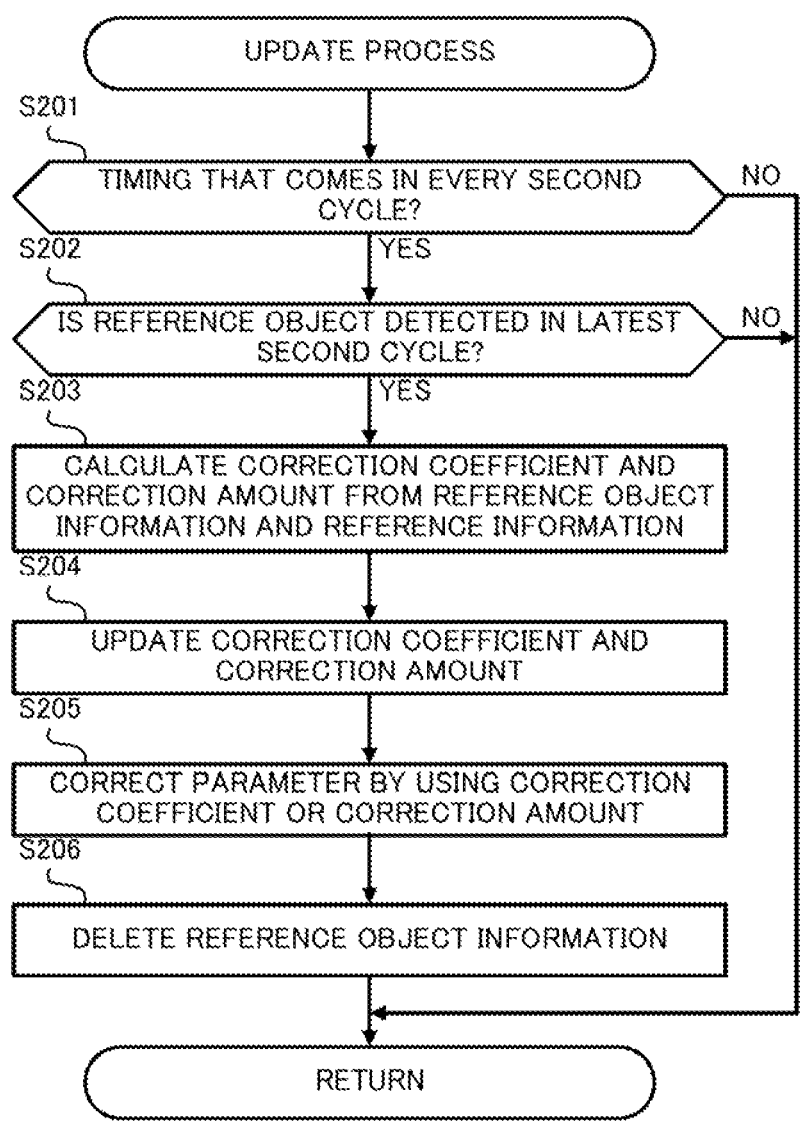
FIG. 11 is a flowchart illustrating an update process illustrated in FIG. 10.
Figure 14:
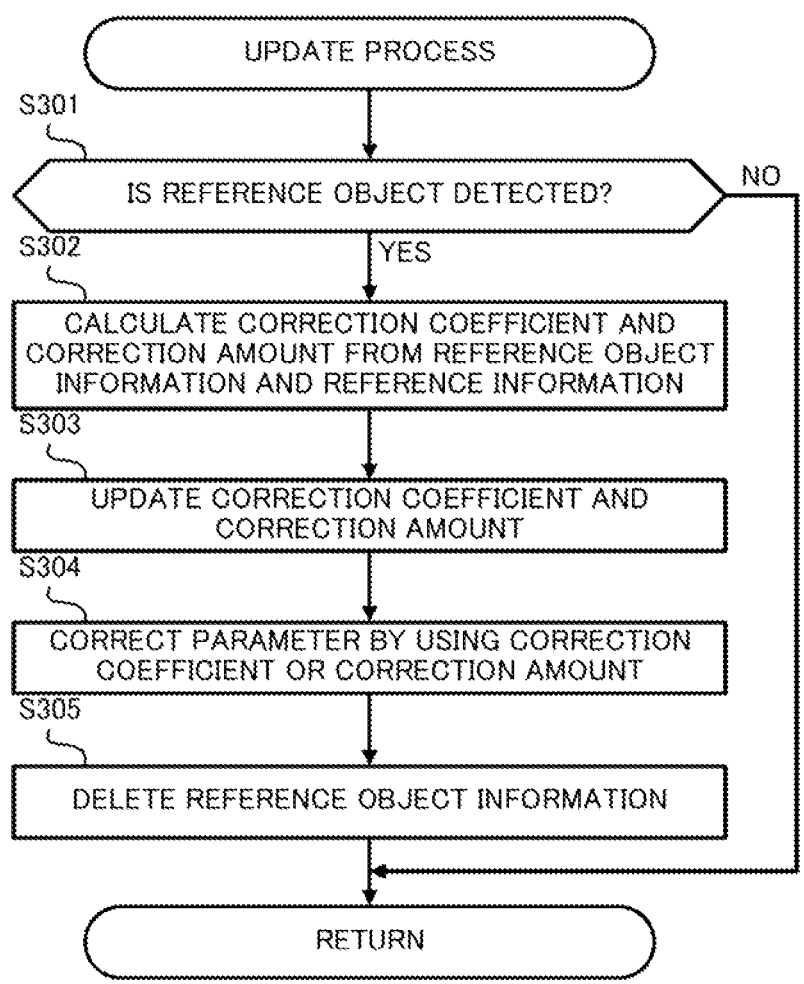
FIG. 14 is a flowchart illustrating an update process that an object detection apparatus according to Embodiment 4 executes.

In the present embodiment, an update process illustrated in FIG. 14 is executed in place of the update process illustrated in FIG. 11. To start with, the detector 190 determines whether a reference object is detected (step S301). For example, if reference object information is stored in the storage 192, the detector 190 determines that the reference object is detected. If the detector 190 determines that the reference object is detected (step S301: YES), the detector 190 calculates a correction coefficient and a correction amount from the reference object information and the reference information (step S302).

Upon completion of the process of step S302, the detector 190 updates the correction coefficient and the correction amount (step S303). Upon completion of the process of step S303, the detector 190 corrects the parameter by using the correction coefficient or the correction amount (step S304). Upon completion of the process of step S304, the detector 190 deletes the reference object information stored in the storage 192 (step S305). If the detector 190 determines that the reference object is not detected (step S301: NO), or if the detector 190 completes the process of step S305, the detector 190 completes the update process.

In the present embodiment, the process of determining the presence or absence of an object is repeatedly executed in the first cycles, and the reference object detection process is executed in each of the first cycles, and, when a reference object is detected, the correction process is executed. According to the present embodiment, the output information or the parameter is quickly corrected when the output information has varied in accordance with the variation of the condition.

Modifications

While the embodiments of the present disclosure have been described above, modifications and applications in various modes can be made in implementing the present disclosure. In the present disclosure, which part of the structures, functions and operations described in the above embodiments is to be adopted is discretionary. In addition, in the present disclosure, besides the above-described structures, functions and operations, other structures, functions and operations may be adopted. The above-described embodiments may freely be combined as appropriate. The number of structural elements described in the embodiments can be adjusted as appropriate. Furthermore, needless to say, the materials, sizes, electrical characteristics, and the like, which can be adopted in the present disclosure, are not limited to those in the above-described embodiments.

In Embodiment 1, the example in which the number of sensors is four is described. The number of sensors may be three or less, or may be five or more. In addition, in Embodiment 1, the example is described in which the ultrasonic sensor is adopted as the sensor 120 that is used for detecting an object. Various types of sensors can be adopted as the sensor 120. For example, as the sensor 120, a millimeter-wave sensor, an X-band sensor, an infrared sensor, and a visible-light sensor can be adopted.

In Embodiment 1, the example is described in which the ranges of the detection distance and the detection amplitude for determining the presence of a detection target are fixed. The ranges of the detection distance and the detection amplitude for determining the presence of a detection target may be adjusted, for example, in accordance with the magnitude of electric power that the power transmission apparatus 200 transmits to the power receiving apparatus 300.

In Embodiment 1, the example is described in which the output information includes the detection distance and the detection amplitude as output values. The output values that the output information includes may be other output values. For example, the output values that the output information includes may be a time from when the sensor 120 transmits a transmission wave until when the sensor 120 receives a reflective wave, the size of an object, the direction in which an object is detected, and the like. In addition, in Embodiment 1, the example is described in which the parameters for the sensor 120 include the amplitude of the transmission wave, and the frequency of the transmission wave. The parameters for the sensor 120 may include other parameters.

In Embodiment 1, the example in which both the output information and the parameter are corrected. It suffices that at least one the output information and the parameter is corrected. For example, only the output information may be corrected, or only the parameter may be corrected.

In Embodiment 1, the example is described in which the detection distance is corrected by the correction amount, and the amplitude of the transmission wave is corrected by the correction coefficient. It is adjustable, as appropriate, by which of the correction amount and the correction coefficient the output information or the parameter is to be corrected. For example, the detection distance may be corrected by the correction coefficient, and the amplitude of the transmission wave may be corrected by the correction amount. In addition, it is adjustable, as appropriate, which of the output information and the parameter is to be corrected. For example, instead of the correction of the parameter that is the amplitude of the transmission wave, the detection amplitude included in the output information may be corrected.

By applying the operation program, which defines the operation of the object detection apparatus 100 according to the present disclosure, to a computer such as an existing personal computer or information terminal apparatus, this computer can be caused to function as the object detection apparatus 100 according to the present disclosure. In addition, a method of distributing the program may be freely chosen, and the program may be distributed by being stored in a non-transitory computer-readable recording medium such as a compact disk ROM (CD-ROM), a digital versatile disk (DVD), a magneto-optical disk (MO) or a memory card, or may be distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An object detection apparatus for detecting an object existing within a detection range, the object detection apparatus comprising:
    a sensor module including:
        a sensor configured to output a signal; and a controller configured to control the sensor and generate output information based on the signal; and
a detector for determining presence or absence of the object, based on the output information, the detector being configured to:
repeatedly execute a reference object detection process of detecting a reference object existing at a predetermined position within the detection range, by comparing the output information and reference information;
when the reference object is detected, execute a correction process of correcting at least one of the output information or a parameter for the sensor, based on the reference information and reference object information indicative of the reference object in the output information; and
when the reference object is not successively detected a predetermined number of times in the reference object detection process, generate a notification indicating occurrence of an abnormality using a notifier.

2. The object detection apparatus according to claim 1, wherein the detector corrects, in the correction process, the output information and the parameter for the sensor, based on the reference object information and the reference information.

3. The object detection apparatus according to claim 2, wherein the parameter for the sensor is a plurality of parameters including a first parameter, the output information includes a first output value that varies by a correction of the first parameter, and a second output value that does not vary by the correction of the first parameter, the detector corrects, in the correction process, the second output value of the output information and the first parameter of the plurality of parameters, based on the reference object information and the reference information.

4. The object detection apparatus according to claim 1, wherein the detector repeatedly executes, in first cycles, a process of determining the presence or the absence of the object, and executes the reference object detection process in each of the first cycles.

5. The object detection apparatus according to claim 1, wherein the detector corrects, in the correction process, at least one of the output information or the parameter for the sensor, based on a correction coefficient or a correction amount, the correction coefficient or the correction amount being based on the reference object information and the reference information, and the detector repeatedly executes, in first cycles, a process of determining the presence or the absence of the object, and updates, when the reference object is detected in the reference object detection process, the correction coefficient or the correction amount in each of the second cycles, each of the second cycles being longer than each of the first cycles.

6. A power transmission apparatus, comprising:
the object detection apparatus according to claim 1; and
a power transmission coil unit that includes a power transmission coil and wirelessly transmits electric power to a power receiver,
wherein the reference object is at rest while the power transmission coil unit is transmitting the electric power.

7. An object detection apparatus for detecting an object, the object detection apparatus comprising: a plurality of sensor modules, each of the plurality of sensor module including: a sensor configured to output a signal; and a controller configured to control the sensor and generate output information based on the signal, the plurality of sensor modules being arranged such that at least one part of at least one other sensor module is included within a detection range of the sensor included in each of the plurality of sensor modules; and a detector for determining presence or absence of the object, based on the output information, the detector being configured to:
execute a reference object detection process of detecting a reference object existing at a predetermined position within a detection range of the object detection apparatus, by comparing the output information and reference information; and when the reference object is detected, execute a correction process of correcting at least one of the output information or a parameter for the sensor, based on the reference information and reference object information indicative of the reference object in the output information, wherein the reference object is the at least one part of the at least one other sensor module, the at least one part of the at least one other sensor module existing within the detection range of the sensor included in each of the plurality of sensor modules.

8. A power transmission apparatus, comprising:
the object detection apparatus according to claim 7; and
a power transmission coil unit that includes a power transmission coil and wirelessly transmits electric power to a power receiver,
wherein the reference object is at rest while the power transmission coil unit is transmitting the electric power.

9. The power transmission apparatus according to claim 8, wherein
the power transmission coil unit includes a housing that accommodates the power transmission coil, and
the plurality of the sensor modules is accommodated in the housing that the power transmission coil unit includes.

10. A power transmission system, comprising:
the power transmission apparatus according to claim 8; and
the power receiver that is mounted in a movable body and receives the electric power from the power transmission apparatus.

11. A power transmission apparatus comprising:
an object detection apparatus for detecting an object existing within a detection range, the object detection apparatus comprising:
a sensor module including:
a sensor configured to output a signal; and
a controller configured to control the sensor and generate output information based on the signal; and
a detector for determining presence or absence of the object, based on the output information, the detector being configured to:
execute a reference object detection process of detecting a reference object existing at a predetermined position within the detection range, by comparing the output information and reference information;
when the reference object is detected, execute a correction process of correcting at least one of the output information or a parameter for the sensor, based on the reference information and reference object information indicative of the reference object in the output information; and
a power transmission coil unit that includes a power transmission coil and wirelessly transmits electric power to a power receiver, wherein the reference object is a part of an object constituting the power transmission apparatus.

12. A power transmission apparatus comprising:
an object detection apparatus for detecting an object existing within a detection range, the object detection apparatus comprising:
- a sensor module including:
  - a sensor configured to output a signal; and
  - a controller configured to control the sensor and generate output information based on the signal; and
- a detector for determining presence or absence of the object, based on the output information, the detector being configured to:
  - execute a reference object detection process of detecting a reference object existing at a predetermined position within the detection range, by comparing the output information and reference information;
  - when the reference object is detected, execute a correction process of correcting at least one of the output information or a parameter for the sensor, based on the reference information and reference object information indicative of the reference object in the output information; and
a power transmission coil unit that includes a power transmission coil and wirelessly transmits electric power to a power receiver,
wherein the reference object is a part of an object constituting the power transmission coil unit.

* * * * *